United States Patent
Minagawa et al.

(10) Patent No.: US 8,859,657 B2
(45) Date of Patent: Oct. 14, 2014

(54) RUBBER COMPOSITION FOR TIRES AND PNEUMATIC TIRE

(75) Inventors: Yasuhisa Minagawa, Kobe (JP); Michio Hirayama, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 13/503,627

(22) PCT Filed: Nov. 10, 2010

(86) PCT No.: PCT/JP2010/069997
§ 371 (c)(1),
(2), (4) Date: Apr. 23, 2012

(87) PCT Pub. No.: WO2011/062099
PCT Pub. Date: May 26, 2011

(65) Prior Publication Data
US 2012/0214918 A1    Aug. 23, 2012

(30) Foreign Application Priority Data

Nov. 19, 2009 (JP) ................. 2009-264246
Jan. 18, 2010 (JP) ................. 2010-008285
Jul. 1, 2010 (JP) ................. 2010-151325

(51) Int. Cl.
| | | |
|---|---|---|
| *C08L 7/00* | (2006.01) | |
| *C08K 3/36* | (2006.01) | |
| *C08K 5/5419* | (2006.01) | |
| *C08L 9/06* | (2006.01) | |
| *C08K 5/098* | (2006.01) | |
| *B60C 1/00* | (2006.01) | |
| *C08L 21/00* | (2006.01) | |
| *C08K 3/26* | (2006.01) | |

(52) U.S. Cl.
CPC . *C08L 21/00* (2013.01); *C08K 3/36* (2013.01); *C08L 9/06* (2013.01); *C08K 5/098* (2013.01); *Y02T 10/862* (2013.01); *B60C 1/00* (2013.01); *C08K 3/26* (2013.01)
USPC .......... 524/262; 524/291; 524/381; 524/424; 524/432; 524/428

(58) Field of Classification Search
CPC ............. C08L 7/00; C08L 9/00; C08L 11/00; C08L 15/00; C08L 21/00; C08K 3/36; C08K 5/09; C08K 5/092; C08K 5/098; C08K 5/5419
See application file for complete search history.

(56) References Cited

U.S. PATENT DOCUMENTS

| | | | |
|---|---|---|---|
| 2003/0004249 A1 | 1/2003 | Yagi et al. | |
| 2007/0149648 A1* | 6/2007 | Yagi et al. | ...................... 523/200 |
| 2008/0260956 A1 | 10/2008 | Sakurai et al. | |

FOREIGN PATENT DOCUMENTS

| | | |
|---|---|---|
| CN | 1990531 A | 7/2007 |
| CN | 102471544 A | 5/2012 |
| EP | 1 577 341 A1 | 9/2005 |
| EP | 1 806 240 A2 | 7/2007 |
| EP | 2 460 848 A1 | 6/2012 |
| JP | 63-35638 A | 2/1988 |
| JP | 2001-247718 A | 9/2001 |
| JP | 2002-220491 A | 8/2002 |
| JP | 2002-220492 A | 8/2002 |
| JP | 2002-327091 A | 11/2002 |
| JP | 2002-338750 A | 11/2002 |
| JP | 2005-232295 A | 9/2005 |
| JP | 2006-213908 A | 8/2006 |
| JP | 2006-348110 A | 12/2006 |
| JP | 2007-77322 A | 3/2007 |
| JP | 2007-321040 A | 12/2007 |
| JP | 2008-56802 A | 3/2008 |
| WO | WO 2010/000294 A1 | 1/2010 |

OTHER PUBLICATIONS

Machine translation of JP 2001-247718 A to Yagi, Sep. 11, 2001.*
Machine translation of JP 2002-327091 A to Suzuki et al., Nov. 15, 2002.*
Machine translation of JP 2007-321040 A to Minagawa (Dec. 13, 2007).*
English full machine-generated translation of JP-2002-220492-A dated Aug. 9, 2002.
English partial translation of JP-63-35638-A dated Feb. 16, 1988.
English machine translation of JP-2006-348110-A, published Dec. 28, 2006.

* cited by examiner

*Primary Examiner* — Vu A Nguyen
(74) *Attorney, Agent, or Firm* — Birch, Stewart, Kolasch & Birch, LLP

(57) ABSTRACT

The present invention provides a rubber composition for a tire in which the reaction rate between a silane coupling agent and silica is increased to enhance the fuel economy and the abrasion resistance, and a pneumatic tire comprising a component of any kind produced using the rubber composition for a tire. The present invention relates to a rubber composition for a tire, comprising: silica; a silane coupling agent; and at least one selected from the group consisting of a hydroxy acid, itaconic acid, and a salt thereof.

11 Claims, No Drawings

RUBBER COMPOSITION FOR TIRES AND PNEUMATIC TIRE

TECHNICAL FIELD

The present invention relates to a rubber composition for a tire and a pneumatic tire produced using the composition.

BACKGROUND ART

Conventionally, silica has been used as a reinforcing filler in order to enhance the safety and the fuel economy of tires. Since use of only silica does not provide a sufficient effect, a silane coupling agent that links silica with a rubber component has been used in combination with silica.

To effect a reaction between a silane coupling agent and silica, an alkoxy group or the like bonding to a silicon atom in the silane coupling agent needs to be hydrolyzed to form a silanol group. However, since hydrolysis of the alkoxy group or the like does not proceed in a short time period, in practice, hydrolysis of the alkoxy group or the like does not proceed sufficiently in the step of mixing the rubber composition. As a result, the reaction rate between the silane coupling agent and silica is lowered, failing to optimize the performance of silica.

As methods for solving the above problem, Patent Documents 1 to 3 disclose providing rubber compositions respectively blended with various sodium salts, various potassium salts, and boric acid. However, the use of a hydroxy acid or itaconic acid is not studied in detail.

Patent Document 1: JP 2001-247718 A
Patent Document 2: JP 2005-232295 A
Patent Document 3: JP 2007-77322 A

SUMMARY OF THE INVENTION

Problems to be Solved by the Invention

The present invention is aimed to solve the above problem and to provide a rubber composition for a tire in which the reaction rate between a silane coupling agent and silica is increased to enhance the fuel economy and the abrasion resistance; and a pneumatic tire comprising a tire component of any kind produced using the rubber composition for a tire.

Means to Solve the Problems

The present invention relates to a rubber composition for a tire, comprising: silica; a silane coupling agent; and at least one selected from the group consisting of a hydroxy acid, itaconic acid, and a salt thereof.

The rubber composition for a tire preferably comprises carbon black.

The hydroxy acid is preferably an aliphatic hydroxy acid.

The hydroxy acid is preferably at least one selected from the group consisting of lactic acid, malic acid, tartaric acid, and citric acid.

The hydroxy acid is preferably malic acid.

The salt is preferably sodium malate.

In the rubber composition for a tire, the hydroxy acid, itaconic acid, and salt thereof each preferably have an average particle size of not more than 300 µm.

In the rubber composition for a tire, the amount of the unreacted silane coupling agent is preferably not more than 15% by mass.

The silane coupling agent is preferably at least one selected from the group consisting of a sulfide-type silane coupling agent, a silane coupling agent represented by Formula (1):

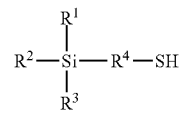

wherein $R^1$ represents a group represented by $-O-(R^5-O)_m-R^6$ in which m pieces of $R^5$ are the same as or different from each other and each represent a branched or unbranched C1 to C30 divalent hydrocarbon group, $R^6$ represents a branched or unbranched C1 to C30 alkyl group, a branched or unbranched C2 to C30 alkenyl group, a C6 to C30 aryl group, or a C7 to C30 aralkyl group, and m represents an integer of 1 to 30; $R^2$ and $R^3$ are the same as or different from each other and each represent the same group as $R^1$, a branched or unbranched C1 to C12 alkyl group, or a group represented by $-O-R^7$ in which $R^7$ represents a hydrogen atom, a branched or unbranched C1 to C30 alkyl group, a branched or unbranched C2 to C30 alkenyl group, a C6 to C30 aryl group, or a C7 to C30 aralkyl group; and $R^4$ represents a branched or unbranched C1 to C30 alkylene group, and a silane coupling agent comprising linking units A and B respectively represented by Formula (2):

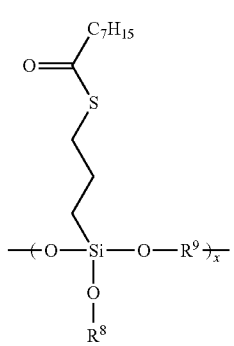

and Formula (3):

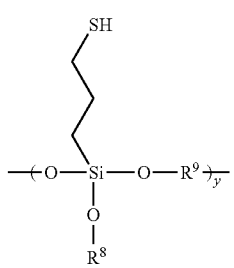

wherein x is an integer of not smaller than 0; y is an integer of not smaller than 1; $R^8$ represents hydrogen, halogen, a branched or unbranched C1 to C30 alkyl or alkylene group, a branched or unbranched C2 to C30 alkenyl or alkenylene group, a branched or unbranched C2 to C30 alkynyl or alkynylene group, or a group in which an end of the alkyl or alkenyl group is substituted by a hydroxy or carboxyl group;

$R^9$ represents hydrogen, a branched or unbranched C1 to C30 alkylene or alkyl group, a branched or unbranched C2 to C30 alkenylene or alkenyl group, or a branched or unbranched C2 to C30 alkynylene or alkynyl group; and $R^8$ and $R^9$ may together form a ring structure.

In the rubber composition for a tire, the amount of the hydroxy acid, itaconic acid, and salt thereof is preferably 0.01 to 25 parts by mass for each 100 parts by mass of the silica.

The rubber composition for a tire preferably comprises an ammonium salt.

The ammonium salt is preferably ammonium carbonate or ammonium hydrogen carbonate.

The rubber composition for a tire is preferably obtained by a method including: a first base mixing step of mixing a rubber component, silica, a silane coupling agent, and at least one selected from the group consisting of a hydroxy acid, itaconic acid, and a salt thereof; a second base mixing step of mixing a mixture 1 obtained in the first base mixing step, stearic acid, and zinc oxide; and a final mixing step of mixing a mixture 2 obtained in the second base mixing step, a vulcanizing agent, and a vulcanization accelerator.

An ammonium salt is preferably mixed together in the first base mixing step.

The first base mixing step preferably includes mixing a rubber component, silica, a silane coupling agent, and at least one selected from the group consisting of a hydroxy acid, itaconic acid, and a salt thereof, and then adding and mixing an ammonium salt.

An ammonium salt is preferably mixed together in the second base mixing step.

The present invention also relates to a pneumatic tire produced using the rubber composition.

Effect of the Invention

According to the present invention, since the rubber composition for a tire comprises silica, a silane coupling agent, and at least one selected from the group consisting of a hydroxy acid, itaconic acid, and a salt thereof, the reaction rate between a silane coupling agent and silica is increased to enhance the fuel economy and the abrasion resistance. Also, use of the rubber composition for a tire component of any kind provides a pneumatic tire excellent in the fuel economy and the abrasion resistance.

MODES FOR CARRYING OUT THE INVENTION

The rubber composition for a tire of the present invention comprises silica, a silane coupling agent, and at least one selected from the group consisting of a hydroxy acid, itaconic acid, and a salt thereof.

The rubber component used in the present invention is not particularly limited. Exemplary rubbers in the rubber component include diene rubbers such as natural rubber (NR), epoxidized natural rubber (ENR), isoprene rubber (IR), butadiene rubber (BR), styrene butadiene rubber (SBR), chloroprene rubber (CR), styrene isoprene butadiene rubber (SIBR), styrene isoprene rubber (SIR), and isoprene butadiene rubber. Each of these diene rubbers may be used alone, or two or more of these may be used in combination. In particular, SBR, NR, ENR, IR, and BR are preferred because the abrasion resistance, the wet-grip performance, and the fuel economy are all achieved at high levels.

The SBR is not particularly limited, and may be emulsion polymerized styrene butadiene rubber (E-SBR), solution polymerized styrene butadiene rubber (S-SBR), or the like.

In the case where the rubber composition of the present invention contains SBR, the SBR content in 100% by mass of the rubber component is preferably not less than 50% by mass, and more preferably not less than 60% by mass. If the SBR content is less than 50% by mass, the wet-grip performance may be insufficient. The SBR content in 100% by mass of the rubber component is preferably not more than 90% by mass, and more preferably not more than 70% by mass. If the SBR content is more than 90% by mass, the fuel economy may be lowered.

As the NR, those commonly used in the tire industry, such as SIR20, RSS#3 and TSR20, may be used.

In the case where the rubber composition of the present invention contains NR, the NR content in 100% by mass of the rubber component is preferably not less than 20% by mass, and more preferably not less than 30% by mass. If the NR content is less than 20% by mass, the rubber strength may be lowered to cause chipping of a rubber portion. The NR content in 100% by mass of the rubber component is preferably not more than 85% by mass, more preferably not more than 70% by mass, still more preferably not more than 50% by mass, and particularly preferably not more than 40% by mass. If the NR content is more than 85% by mass, the wet-grip performance may be lowered.

The BR is not particularly limited, and examples thereof include BR with high cis content such as BR1220 supplied by ZEON Corporation, and BR130B and BR150B both supplied by Ube Industries, Ltd., and syndiotactic polybutadiene crystal-containing BR such as VCR412 and VCR617 both supplied by Ube Industries, Ltd.

In the case where the rubber composition of the present invention contains BR, the BR content in 100% by mass of the rubber component is preferably not less than 5% by mass, and more preferably not less than 15% by mass. If the BR content is less than 5% by mass, the abrasion resistance may be insufficient. The BR content in 100% by mass of the rubber component is preferably not more than 40% by mass, and more preferably not more than 30% by mass. If the BR content is more than 40% by mass, the rubber strength may be lowered to cause chipping of a rubber portion.

Silica is used in the present invention. Silica enhances the wet-grip performance and the fuel economy. The silica is not particularly limited, and examples thereof include dry silica (silicic anhydride) and wet silica (hydrous silicic acid). Wet silica is preferred because it contains a lot of silanol groups.

The nitrogen adsorption specific surface area ($N_2SA$) of silica is preferably not less than 40 m$^2$/g, more preferably not less than 50 m$^2$/g, still more preferably not less than 100 m$^2$/g, and particularly preferably not less than 150 m$^2$/g. If the $N_2SA$ is less than 40 m$^2$/g, the abrasion resistance may be insufficient. The $N_2SA$ of silica is preferably not more than 220 m$^2$/g, and more preferably 200 m$^2$/g. If the $N_2SA$ is more than 220 m$^2$/g, such silica may be hardly dispersed in the rubber component, resulting in a dispersion failure.

Here, the nitrogen adsorption specific surface area of silica is measured by the BET method in accordance with ASTM D3037-81.

The amount of the silica is preferably not less than five parts by mass, more preferably not less than 15 parts by mass, still more preferably not less than 20 parts by mass, and particularly preferably not less than 30 parts by mass, for each 100 parts by mass of the rubber component. If the amount of the silica is less than five parts by mass, the rubber strength may be insufficient and the abrasion resistance may be lowered. When the amount of the silica is not less than 20 parts by mass, the hydroxy acid, itaconic acid, and salt thereof can be dissolved in the adsorbed water released from the silica during the mixing, so that they are well dispersed. The amount of the silica is preferably not more than 150 parts by mass, and more preferably not more than 120 parts by mass. If the amount of the silica is more than 150 parts by mass, the silica may not be uniformly dispersed, resulting in a reduction in the abrasion resistance.

A silane coupling agent is used in the present invention. A silane coupling agent links rubber with silica to enhance the abrasion resistance. The silane coupling agent used in the present invention is not particularly limited, and examples thereof include: sulfide-type silane coupling agents such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl)tetrasulfide, bis(4-trimethoxysilylbutyl)tetrasulfide, bis(3-triethoxysilylpropyl)trisulfide, bis(2-triethoxysilylethyl)trisulfide, bis(4-triethoxysilylbutyl)trisulfide, bis(3-trimethoxysilylpropyl)trisulfide, bis(2-trimethoxysilylethyl)trisulfide, bis(4-trimethoxysilylbutyl)trisulfide, bis(3-triethoxysilylpropyl)disulfide, bis(2-triethoxysilylethyl)disulfide, bis(4-triethoxysilylbutyl)disulfide, bis(3-trimethoxysilylpropyl)disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 2-trimethoxysilylethyl-N,N-dimethylthiocarbamoyl tetrasulfide, 3-trimethoxysilylpropyl benzothiazolyl tetrasulfide, 3-triethoxysilylpropyl benzothiazole tetrasulfide, 3-triethoxysilylpropyl methacrylate monosulfide, and 3-trimethoxysilylpropyl methacrylate monosulfide; vinyl-type silane coupling agents such as vinyltriethoxysilane and vinyltrimethoxysilane; amino-type silane coupling agents such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy-type silane coupling agents such as γ-glycidoxypropyltriethoxysilane, γ-glycidoxypropyltrimethoxysilane, γ-glycidoxypropylmethyldiethoxysilane, and γ-glycidoxypropylmethyldimethoxysilane; nitro-type silane coupling agents such as 3-nitropropyltrimethoxysilane and 3-nitropropyltriethoxysilane; chloro-type silane coupling agents such as 3-chloropropyltrimethoxysilane, 3-chloropropyltriethoxysilane, 2-chloroethyltrimethoxysilane, and 2-chloroethyltriethoxysilane; silane coupling agents represented by the following Formula (1); and silane coupling agents comprising a linking unit A represented by the following Formula (2) and a linking unit B represented by the following Formula (3). Among these, sulfide-type silane coupling agents (more preferably, bis(3-triethoxysilylpropyl)tetrasulfide and bis(3-triethoxysilylpropyl)disulfide), silane coupling agents represented by the Formula (1), and silane coupling agents comprising a linking unit A represented by the Formula (2) and a linking unit B represented by the Formula (3) are preferred. Moreover, silane coupling agents represented by the Formula (1) and silane coupling agents comprising a linking unit A represented by the Formula (2) and a linking unit B represented by the Formula (3) are more preferred.

The silane coupling agent represented by the Formula (1) leads to less heat build-up (better fuel economy) and higher rubber strength.

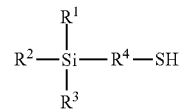

(1)

$$R^2-\underset{\underset{R^3}{|}}{\overset{\overset{R^1}{|}}{Si}}-R^4-SH$$

In Formula (1), $R^1$ represents a group represented by —O—$(R^5$—O$)_m$—$R^6$ (in which m pieces of $R^5$ are the same as or different from each other and each represent a branched or unbranched C1 to C30 divalent hydrocarbon group, $R^6$ represents a branched or unbranched C1 to C30 alkyl group, a branched or unbranched C2 to C30 alkenyl group, a C6 to C30 aryl group, or a C7 to C30 aralkyl group, and m represents an integer of 1 to 30).

The $R^5$s are the same as or different from each other and each represent a branched or unbranched C1 to C30 (preferably C1 to C15, and more preferably C1 to C3) divalent hydrocarbon group.

Examples of the hydrocarbon group include branched or unbranched C1 to C30 alkylene groups, branched or unbranched C2 to C30 alkenylene groups, branched or unbranched C2 to C30 alkynylene groups, and C6 to C30 arylene groups. In particular, the alkylene groups are preferred because they are each easily bonded to silica, which is advantageous from the standpoint of less heat build-up (better fuel economy).

Examples of the branched or unbranched C1 to C30 (preferably C1 to C15, and more preferably C1 to C3) alkylene group of $R^5$ include a methylene group, an ethylene group, a propylene group, a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, and an octadecylene group.

Examples of the branched or unbranched C2 to C30 (preferably C2 to C15, and more preferably C2 to C3) alkenylene group of $R^5$ include a vinylene group, a 1-propenylene group, a 2-propenylene group, a 1-butenylene group, a 2-butenylene group, a 1-pentenylene group, a 2-pentenylene group, a 1-hexenylene group, a 2-hexenylene group, and a 1-octenylene group.

Examples of the branched or unbranched C2 to C30 (preferably C2 to C15, and more preferably C2 to C3) alkynylene group of $R^5$ include an ethynylene group, a propynylene group, a butynylene group, a pentynylene group, a hexynylene group, a heptynylene group, an octynylene group, a nonynylene group, a decynylene group, an undecynylene group, and a dodecynylene group.

Examples of the branched or unbranched C6 to C30 (preferably C6 to C15) arylene group of $R^5$ include a phenylene group, a tolylene group, a xylylene group, and a naphthylene group.

The "m" represents an integer of 1 to 30 (preferably 2 to 20, more preferably 3 to 7, and still more preferably 5 to 6).

The $R^6$ represents a branched or unbranched C1 to C30 alkyl group, a branched or unbranched C2 to C30 alkenyl group, a C6 to C30 aryl group, or a C7 to C30 aralkyl group. In particular, $R^6$ is preferably a branched or unbranched C1 to C30 alkyl group because of its high reactivity with silica.

Examples of the branched or unbranched C1 to C30 (preferably C3 to C25, and more preferably C10 to C15) alkyl group of $R^6$ include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group, a nonyl group, a decyl group, an undecyl group, a dodecyl group, a tridecyl group, a tetradecyl group, a pentadecyl group, and an octadecyl group.

Examples of the branched or unbranched C2 to C30 (preferably C3 to C25, and more preferably C10 to C15) alkenyl group of $R^6$ include a vinyl group, a 1-propenyl group, a 2-propenyl group, a 1-butenyl group, a 2-butenyl group, a 1-pentenyl group, a 2-pentenyl group, a 1-hexenyl group, a 2-hexenyl group, a 1-octenyl group, a decenyl group, an undecenyl group, a dodecenyl group, a tridecenyl group, a tetradecenyl group, a pentadecenyl group, and an octadecenyl group.

Examples of the C6 to C30 (preferably C10 to C20) aryl group of $R^6$ include a phenyl group, a tolyl group, a xylyl group, a naphtyl group, and a biphenyl group.

Examples of the C7 to C30 (preferably C10 to C20) aralkyl group of $R^6$ include a benzyl group and a phenethyl group.

Specific examples of $R^1$ in Formula (1) include: —O—$(C_2H_4$—$O)_5$—$C_{11}H_{23}$, —O—$(C_2H_4$—$O)_5$—$C_{12}H_{25}$, —O—$(C_2H_4$—$O)_5$—$C_{13}H_{27}$, —O—$(C_2H_4$—$O)_5$—$C_{14}H_{29}$, —O—$(C_2H_4$—$O)_5$—$C_{15}H_{31}$, —O—$(C_2H_4$—$O)_3$—$C_{13}H_{27}$, —O—$(C_2H_4$—$O)_4C_{13}H_{27}$, —O—$(C_2H_4$—$O)_6$—$C_{13}H_{27}$, and —O—$(C_2H_4$—$O)_7$—$C_{13}H_{27}$. In particular, —O—$(C_2H_4$—$O)_5$—$C_{11}H_{23}$, —O—$(C_2H_4$—$O)_5$—$C_{13}H_{27}$, —O—$(C_2H_4$—$O)_5$—$C_{15}H_{31}$, and —O—$(C_2H_4$—$O)_6$—$C_{13}H_{27}$ are preferred.

$R^2$ and $R^3$ are the same as or different from each other and each represent the same group as $R^1$ (i.e. a group represented by —O—$(R^5$—$O)_m$—$R^6$), a branched or unbranched C1 to C12 alkyl group, or a group represented by —O—$R^7$ (in which $R^7$ represents a hydrogen atom, a branched or unbranched C1 to C30 alkyl group, a branched or unbranched C2 to C30 alkenyl group, a C6 to C30 aryl group, or a C7 to C30 aralkyl group). In particular, from the standpoint of chemical stability, the same group as $R^1$ or a group represented by —O—$R^7$ (in which $R^7$ represents a branched or unbranched C1 to C30 alkyl group) is preferred.

Examples of the branched or unbranched C1 to C12 alkyl group of $R^2$ and $R^3$ include a methyl group, an ethyl group, an n-propyl group, an isopropyl group, an n-butyl group, an iso-butyl group, a sec-butyl group, a tert-butyl group, a pentyl group, a hexyl group, a heptyl group, a 2-ethylhexyl group, an octyl group, and a nonyl group.

Examples of the branched or unbranched C1 to C30 (preferably C1 to C3) alkyl group of $R^7$ include the same groups as the exemplary groups of the branched or unbranched C1 to C30 alkyl group of $R^6$.

Examples of the branched or unbranched C2 to C30 alkenyl group of $R^7$ include the same groups as the exemplary groups of the branched or unbranched C2 to C30 alkenyl group of $R^6$.

Examples of the C6 to C30 aryl group of $R^7$ include the same groups as the exemplary groups of the C6 to C30 aryl group of $R^6$.

Examples of the C7 to C30 aralkyl group of $R^7$ include the same groups as the exemplary groups of the C7 to C30 aralkyl group of $R^6$.

Specific examples of $R^2$ and $R^3$ in Formula (1) include: —O—$(C_2H_4$—$O)_5$—$C_{11}H_{23}$, —O—$(C_2H_4$—$O)_5$—$C_{12}H_{25}$, —O—$(C_2H_4$—$O)_5$—$C_{13}H_{27}$, —O—$(C_2H_4$—$O)_5C_{14}H_{29}$, —O—$(C_2H_4$—$O)_5$—$C_{15}H_{31}$, —O—$(C_2H_4$—$O)_3$—$C_{13}H_{27}$, —O—$(C_2H_4$—$O)_4$—$C_{13}H_{27}$, —O—$(C_2H_4$—$O)_6$—$C_{13}H_{27}$, —O—$(C_2H_4$—$O)_7$—$C_{13}H_{27}$, $C_2H_5$—O—, $CH_3$—O—, and $C_3H_7$—O—. In particular, —O—$(C_2H_4$—$O)_5$—$C_{11}H_{23}$, —O—$(C_2H_4$—$O)_5$—$C_{13}H_{27}$, —O—$(C_2H_4$—$O)_5$—$C_{15}H_{31}$, —O—$(C_2H_4$—$O)_6$—$C_{13}H_{27}$, and $C_2H_5$—O— are preferred.

Examples of the branched or unbranched C1 to C30 (preferably C1 to C5) alkylene group of $R^4$ include the same groups as the exemplary groups of the branched or unbranched C1 to C30 alkylene group of $R^5$.

Examples of the silane coupling agent represented by Formula (1) include Si363 supplied by Evonik Degussa. Each of such silane coupling agents may be used alone, or two or more of them may be used in combination.

Use of a silane coupling agent comprising a linking unit B represented by the following Formula (3) and, if necessary, a linking unit A represented by the following Formula (2) leads to less heat build-up (better fuel economy) and higher rubber strength.

The silane coupling agent comprising linking units A and B is preferably a copolymer in which the proportion of the linking unit B is 1 to 70 mol % of the total molar amount of the linking units A and B.

In the case where the molar ratio of the linking unit A and the linking unit B satisfies the above condition, increase in the viscosity during the processing is suppressed, compared to the case of polysulfide silanes such as bis-(3-triethoxysilyl-propyl)tetrasulfide. The reason for this is presumably that the Mooney viscosity is less likely to increase because the sulfide moiety of the linking unit A is a C—S—C bond which is thermally stable compared to tetrasulfide or disulfide.

Moreover, in the case where the molar ratio of the linking unit A and the linking unit B satisfies the above condition, reduction in the scorch time is suppressed, compared to the case of mercapto silanes such as 3-mercaptopropyltrimethoxysilane. The reason for this is presumably that scorch is not readily caused because the linking unit B is less likely to react with polymer as the —$C_7H_{15}$ moiety of the linking unit A covers the —SH group of the linking unit B, though the linking unit B has a mercaptosilane structure.

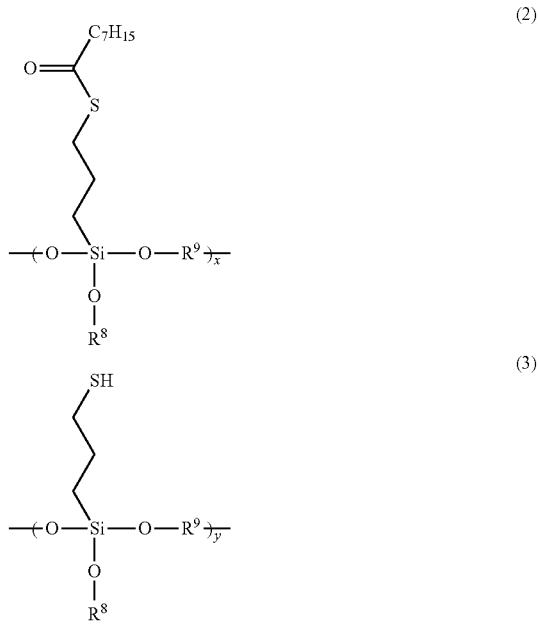

In Formulae (2) and (3), x is an integer of not smaller than 0 (preferably not smaller than 1), y is an integer of not smaller than 1, $R^8$ represents hydrogen, halogen, a branched or unbranched C1 to C30 alkyl or alkylene group, a branched or unbranched C2 to C30 alkenyl or alkenylene group, a branched or unbranched C2 to C30 alkynyl or alkynylene group, or a group in which an end of the alkyl or alkenyl group is substituted by a hydroxy or carboxyl group, $R^9$ represents hydrogen, a branched or unbranched C1 to C30 alkylene or alkyl group, a branched or unbranched C2 to C30 alkenylene or alkenyl group, or a branched or unbranched C2 to C30 alkynylene or alkynyl group, and $R^8$ and $R^9$ may together form a ring structure.

Examples of the halogen of $R^8$ include chlorine, bromine, and fluorine.

Examples of the branched or unbranched C1 to C30 (preferably C1 to C12, and more preferably C1 to C5) alkyl group of $R^8$ and $R^9$ include the same groups as the exemplary groups of the branched or unbranched C1 to C30 alkyl group of $R^6$.

Examples of the branched or unbranched C1 to C30 (preferably C1 to C12) alkylene group of $R^8$ and $R^9$ include the same groups as the exemplary groups of the branched or unbranched C1 to C30 alkylene group of $R^5$.

Examples of the branched or unbranched C2 to C30 (preferably C2 to C12) alkenyl group of $R^8$ and $R^9$ include the same groups as the exemplary groups of the branched or unbranched C2 to C30 alkenyl group of $R^6$.

Examples of the branched or unbranched C2 to C30 (preferably C2 to C12) alkenylene group of $R^8$ and $R^9$ include the same groups as the exemplary groups of the branched or unbranched C2 to C30 alkenylene group of $R^5$.

Examples of the branched or unbranched C2 to C30 (preferably C2 to C12) alkynyl group of $R^8$ and $R^9$ include an ethynyl group, a propynyl group, a butynyl group, a pentynyl group, a hexynyl group, a heptynyl group, an octynyl group, a nonynyl group, a decynyl group, an undecynyl group, and a dodecynyl group.

Examples of the branched or unbranched C2 to C30 (preferably C2 to C12) alkynylene group of $R^8$ and $R^9$ include the same groups as the exemplary groups of the branched or unbranched C2 to C30 alkynylene group of $R^5$.

In the silane coupling agent comprising linking units A and B, the total number of repetitions (x+y) of the number of repetitions (x) of the linking unit A and the number of repetitions (y) of the linking unit B is preferably within a range of 3 to 300. If the total number of repetitions is within this range and x is not smaller than 1, —$C_7H_{15}$ of the linking unit A covers the mercaptosilane of the linking unit B. Therefore, reduction in the scorch time can be suppressed while fine reactivity of the silane coupling agent with silica and the rubber component is secured.

Examples of the silane coupling agent comprising linking units A and B include NXT-Z30, NXT-Z45, NXT-Z60, and NXT-Z100 all supplied by Momentive. Each of these may be used alone, or two or more of these may be used in combination.

The amount of the silane coupling agent is preferably not less than 0.1 parts by mass, more preferably not less than two parts by mass, still more preferably not less than four parts by mass, and particularly preferably not less than six parts by mass, for each 100 parts by mass of silica. If the amount of the silane coupling agent is less than 0.1 parts by mass, an effect of reducing the rolling resistance (improvement in the fuel economy) tends not to be sufficiently obtained. The amount of the silane coupling agent is preferably not more than 20 parts by mass, more preferably not more than 15 parts by mass, and still more preferably not more than 10 parts by mass. If the amount of the silane coupling agent is more than 20 parts by mass, an effect of reducing the rolling resistance (improvement in the fuel economy) commensurate with the amount of the expensive silane coupling agent tends not to be obtained.

In the case where two or more kinds of silane coupling agents are used in combination, the amount refers to the total amount of them.

In the present invention, at least one selected from the group consisting of a hydroxy acid, itaconic acid, and a salt thereof is blended. This promotes a hydrolysis reaction of an alkoxy group or the like contained in the silane coupling agent so that the hydrolysis reaction of alkoxy groups or the like sufficiently proceeds (silanol groups are sufficiently formed) in the step of mixing the rubber composition. As a result, the reaction rate between the silane coupling agent and silica is increased to enhance the fuel economy and the abrasion resistance of the resulting rubber composition (pneumatic tire).

Among hydroxy acids, itaconic acid, and salts thereof, hydroxy acids and itaconic acid are preferred because they each have a low melting point and are dissolved and well dispersed during the mixing of the rubber composition. Here, though salts of a hydroxy acid and/or itaconic acid tend to have lower dispersibility compared to hydroxy acids and itaconic acid, they have an advantage in effectively increasing the reaction rate of the silane coupling agent and silica. The dispersibility of a salt of a hydroxy acid and/or itaconic acid can be improved by adjusting the amount of silica to not less than 20 parts by mass or by reducing the average particle size of the salt.

The hydroxy acid in the present invention refers to a carboxylic acid containing a hydroxy group (i.e. a compound containing a hydroxy group and a carboxyl group). Examples of the hydroxy acid include: aliphatic hydroxy acids such as lactic acid, malic acid, tartaric acid, citric acid, cerebronic acid, tartronic acid, hydroxybutyric acid, leucic acid, glycolic acid, and pantoic acid; and aromatic hydroxy acids such as salicylic acid and benzilic acid. In particular, aliphatic hydroxy acids are preferred because they are environmentally friendly. Lactic acid, malic acid, tartaric acid, and citric acid are more preferred. Further, malic acid is still more preferred.

Examples of the salt include sodium salts, potassium salts, calcium salts, lithium salts, and zinc salts of the hydroxy acid and itaconic acid. In particular, sodium salts and potassium salts are preferred from the standpoint of the reactivity of the silane coupling agent with silica. Moreover, sodium salts are more preferred.

The hydroxy acid, itaconic acid, and salt thereof each preferably have an average particle size of not more than 300 μm, more preferably not more than 150 μm, and still more preferably not more than 120 μm because they can be dissolved and well dispersed during the mixing of the rubber composition. The lower limit of the average particle size is not particularly limited. Having such an average particle size, even a salt of a hydroxy acid and/or itaconic acid, which has a high melting point, can be favorably dispersed.

The average particle size of the hydroxy acid, itaconic acid, and salt thereof may be determined by averaging particle sizes of 100 particles measured in an image taken by a scanning electron microscope.

In the step of mixing the rubber composition, the hydroxy acid, itaconic acid, and salt thereof are each preferably used in the form of powder. This allows the rubber composition of the present invention to be produced efficiently and at low cost.

The amount of the hydroxy acid, itaconic acid, and salt thereof is preferably not less than 0.3 parts by mass, more preferably not less than 0.5 parts by mass, still more preferably not less than one part by mass, and particularly preferably not less than two parts by mass, for each 100 parts by mass of silica. If the amount is less than 0.3 parts by mass, an effect of increasing the reaction rate between the silane coupling agent and silica may not be sufficiently obtained. The amount is preferably not more than 25 parts by mass, more preferably not more than 20 parts by mass, still more preferably not more than 10 parts by mass, and particularly preferably not more than six parts by mass. If the amount is more than 25 parts by mass, the amount of foreign matter in the rubber composition may be increased, which may increase the rolling resistance, thereby lowering the fuel economy.

In the case where the hydroxy acid, itaconic acid, and salt thereof are used in combination, the above amount refers to the total amount of these.

According to the present invention, an ammonium salt is preferably blended. Use of an ammonium salt in combination with at least one selected from the group consisting of a hydroxy acid, itaconic acid, and a salt thereof further promotes a hydrolysis reaction of an alkoxy group or the like contained in the silane coupling agent so that the hydrolysis reaction of alkoxy groups or the like sufficiently proceeds (silanol groups are sufficiently formed) in the step of mixing the rubber composition. As a result, the reaction rate between the silane coupling agent and silica is further increased to enhance the fuel economy and the abrasion resistance of the resulting rubber composition (pneumatic tire).

Examples of the ammonium salt include ammonium carbonate, ammonium hydrogen carbonate, and the like. In particular, ammonium carbonate and ammonium hydrogen carbonate are preferred as they further enhance the effects of the present invention.

The amount of the ammonium salt is preferably not less than 0.5 parts by mass, and more preferably not less than 1 part by mass, for each 100 parts by mass of silica. If the amount is less than 0.5 parts by mass, an effect of increasing the reaction rate between the silane coupling agent and silica may not be sufficiently obtained. The amount is preferably not more than 20 parts by mass, and more preferably not more than 10 parts by mass. If the amount is more than 20 parts by mass, the amount of foreign matter in the rubber composition may be increased, which may increase the rolling resistance, thereby lowering the fuel economy.

In addition to the ingredients mentioned above, the rubber composition of the present invention may appropriately contain additives commonly used in the production of rubber compositions, such as carbon black, reinforcing fillers such as clay, zinc oxide, stearic acid, various antioxidants, softeners such as oil, wax, vulcanizing agents such as sulfur, and vulcanization accelerators.

The rubber composition of the present invention preferably contains carbon black. Carbon black provides fine abrasion resistance. The carbon black is not particularly limited, and commonly used ones in the tire industry may be used.

The nitrogen adsorption specific surface area ($N_2SA$) of the carbon black is preferably not less than 50 $m^2/g$, and more preferably not less than 100 $m^2/g$. If the $N_2SA$ is less than 50 $m^2/g$, sufficient reinforcement is less likely to be obtained. The $N_2SA$ of the carbon black is preferably not more than 200 $m^2/g$, and more preferably not more than 150 $m^2/g$. If the $N_2SA$ is more than 200 $m^2/g$, the fuel economy is likely to be lowered.

Here, the nitrogen adsorption specific surface area of carbon black is measured by the A method of JIS K6217.

The amount of the carbon black is preferably not less than three parts by mass, more preferably not less than 5 parts by mass, and still more preferably not less than 15 parts by mass, for each 100 parts by mass of the rubber component. If the amount is less than three parts by mass, the obliterating power may be lowered so that sufficient weather resistance cannot be obtained. The amount of the carbon black is preferably not more than 100 parts by mass, more preferably not more than 40 parts by mass, and still more preferably not more than 30 parts by mass. If the amount is more than 100 parts by mass, the rubber composition tends to be too hard. Moreover, the effect of enhancing the fuel economy caused by silica is likely to be reduced.

Examples of vulcanization accelerators usable in the present invention include N-tert-butyl-2-benzothiazolylsulfenamide (TBBS), N-cyclohexyl-2-benzothiazolylsulfenamide (CBS), N,N'-dicyclohexyl-2-benzothiazolylsulfenamide (DZ), mercaptobenzothiazole (MBT), dibenzothiazolyldisulfide (MBTS), and diphenylguanidine (DPG). In particular, DPG is preferred because favorable fuel economy and abrasion resistance are obtained.

The amount of DPG is preferably not less than 0.2 parts by mass, and more preferably not less than 0.4 parts by mass, for each 100 parts by mass of the rubber component. If the amount of DPG is less than 0.2 parts by mass, the rubber composition tends not to be sufficiently vulcanized, which is unlikely to provide the necessary rubber properties. The amount of DPG is preferably not more than 1.8 parts by mass, and more preferably not more than 1.6 parts by mass. If the amount of DPG is more than 1.8 parts by mass, rubber scorch may occur.

As the method for producing the rubber composition of the present invention, known methods may be employed. An exemplary method includes the steps of mixing the various ingredients mentioned above with a mixing machine such as an open roll mill and a Banbury mixer and then vulcanizing the resulting mixture.

As the effects of the present invention can be further enhanced, the rubber composition of the present invention is preferably produced by a method including: a first base mixing step of mixing a rubber component, silica, a silane coupling agent, and at least one selected from the group consisting of a hydroxy acid, itaconic acid, and a salt thereof; a second base mixing step of mixing a mixture 1 obtained in the first base mixing step, stearic acid, and zinc oxide; and a final mixing step of mixing a mixture 2 obtained in the second base mixing step, a vulcanizing agent, and a vulcanization accelerator. In such a method, it is possible to prevent zinc oxide and stearic acid from acting to reduce the effect of promoting the hydrolysis reaction of a silane coupling agent caused by the hydroxy acid, itaconic acid, and salt thereof. Accordingly, the reaction rate between silica and a silane coupling agent is increased and the amount of the unreacted silane coupling agent can be reduced to not more than 15% by mass (preferably not more than 10% by mass).

The amount of the unreacted silane coupling agent may be measured by a method mentioned later in EXAMPLES.

As the reaction rate between the silane coupling agent and silica can be further increased, an ammonium salt is preferably mixed together in the first base mixing step or second base mixing step. In the case where an ammonium salt is mixed, as the effects of the present invention can be further enhanced, it is preferable to mix a rubber component, silica, a silane coupling agent, and at least one selected from the group consisting of a hydroxy acid, itaconic acid, and a salt thereof, and then add and mix an ammonium salt. Namely, an ammonium salt is preferably added and mixed in the middle of the first base mixing step or in the second base mixing step. In the case where an ammonium salt is mixed in the first base mixing step, an ammonium salt is more preferably added and mixed in the latter half of the first base mixing step.

In such cases, the first mixing of a rubber component, silica, a silane coupling agent, and at least one selected from the group consisting of a hydroxy acid, itaconic acid, and a salt thereof promotes a hydrolysis reaction of an alkoxy group or the like contained in the silane coupling agent to increase the reaction rate between the silane coupling agent and silica. Then, the addition and subsequent mixing of an ammonium salt further promotes the hydrolysis reaction of an alkoxy group or the like contained in the silane coupling agent to further increase the reaction rate between the silane coupling agent and silica. Specifically, the rubber composition is preferably produced by the following method 1 or 2.

(Method 1)
(First Base Mixing Step)

The first base mixing step includes mixing, with a mixing machine for example, a rubber component, silica, a silane coupling agent, and at least one selected from the group consisting of a hydroxy acid, itaconic acid, and a salt thereof, and then adding and mixing an ammonium salt. In the first base mixing step, oil, carbon black, and the like may also be mixed together. From the standpoint of reducing the load on the mixing machine, oil is preferably mixed in the first base mixing step.

(Second Base Mixing Step)

The second base mixing step includes mixing, with a mixing machine for example, a mixture obtained in the first base mixing step, stearic acid, and zinc oxide. In the second base mixing step, an antioxidant, wax, and the like are preferably mixed together for the same reason as when stearic acid and zinc oxide are mixed.

(Final Mixing Step)

The final mixing step includes mixing, with a mixing machine for example, a mixture 2 obtained in the second base mixing step, a vulcanizing agent, and a vulcanization accelerator.

(Vulcanization Step)

A mixture (unvulcanized rubber composition) obtained in the final mixing step is vulcanized at 140° C. to 185° C. for 5 to 40 minutes to give a vulcanized rubber composition.

(Method 2)
(First Base Mixing Step)

The first base mixing step includes mixing, with a mixing machine for example, a rubber component, silica, a silane coupling agent, and at least one selected from the group consisting of a hydroxy acid, itaconic acid, and a salt thereof. In the first base mixing step, oil, carbon black, and the like may also be mixed together. From the standpoint of reducing the load on the mixing machine, oil is preferably mixed in the first base mixing step.

(Second Base Mixing Step)

The second base mixing step includes mixing, with a mixing machine for example, a mixture 1 obtained in the first base mixing step, stearic acid, zinc oxide, and an ammonium salt. In the second base mixing step, an antioxidant, wax, and the like are preferably mixed together for the same reason as when stearic acid and zinc oxide are mixed.

(Final Mixing Step)

The final mixing step includes mixing, with a mixing machine for example, a mixture 2 obtained in the second base mixing step, a vulcanizing agent, and a vulcanization accelerator.

(Vulcanization Step)

A mixture (unvulcanized rubber composition) obtained in the final mixing step is vulcanized at 140° C. to 185° C. for 5 to 40 minutes to give a vulcanized rubber composition.

In the methods 1 and 2, the mixing temperature is preferably 130° C. to 160° C. in the first base mixing step and 130° C. to 155° C. in the second base mixing step.

If the mixing temperature in each step is below the lower limit, the hydroxy acid, itaconic acid, and salt thereof may not each be sufficiently melted. On the other hand, if the mixing temperature in each step is above the upper limit, the rubber composition may be degraded.

The mixing temperature in the final mixing step is not particularly limited, and may be about 70-120° C.

The rubber composition of the present invention may be used for various tire components such as treads (e.g. cap tread, base tread), sidewalls, clinches, and inner liners. In particular, the rubber composition can be suitably used for treads.

The pneumatic tire of the present invention is produced by a usual method using the above rubber composition. Specifically, an unvulcanized rubber composition blended with various additives as appropriate is extruded and processed into the shape of a tire component. Building is carried out in a usual manner in a tire building machine so that the resulting component is assembled with other tire components to form an unvulcanized tire. Then, the unvulcanized tire is heated and pressurized in a vulcanizer to produce a tire.

The tire of the present invention is suitably used as a tire for passenger cars, for buses, and for trucks, for example.

EXAMPLES

The following examples illustrate the present invention in more detail. They are, however, by no means limitative of the scope of the invention.

In the following, chemicals used in Examples and Comparative Examples are listed.

SBR (1): SBR Nipol NS210 supplied by ZEON Corporation
SBR (2): SBR1502 supplied by JSR Corporation
NR: RSS#3
BR: BR130B supplied by Ube Industries, Ltd.
Carbon black: DIABLACK I ($N_2SA$: 114 $m^2/g$) supplied by Mitsubishi Chemical Corporation
Silica: ULTRASIL VN3 ($N_2SA$: 175 $m^2/g$) supplied by Evonik Degussa Silane coupling agent 1: Si266
(bis(3-triethoxysilylpropyl)disulfide) supplied by Evonik Degussa
Silane coupling agent 2: Si363 (silane coupling agent represented by the following formula (Formula (1)) wherein $R^1=\!\!-\!\!O\!\!-\!\!C_2H_4\!\!-\!\!O)_5\!\!-\!\!C_{13}H_{27}$, $R^2\!=\!C_2H_5\!\!-\!\!O\!\!-\!$, $R^3\!=\!\!-\!\!O\!\!-\!\!(C_2H_4\!\!-\!\!O)_5\!\!-\!\!C_{13}H_{27}$, and $R^4\!\!=\!\!-\!\!C_3H_6\!\!-\!$)) supplied by Evonik Degussa

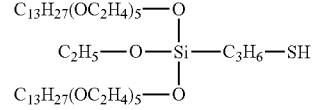

Silane coupling agent 3: NXT-Z45 (copolymer of linking units A and B (linking unit A: 55 mol %, linking unit B: 45 mol %)) supplied by Momentive
Silane coupling agent 4: Si69
(bis(3-triethoxysilylpropyl)tetrasulfide) supplied by Evonik Degussa
Stearic acid: stearic acid beads "Tsubaki" supplied by NOF Corporation
Zinc oxide: zinc oxide #2 supplied by Mitsui Mining & Smelting Co., Ltd.
Aromatic oil: X140 supplied by Japan Energy Corporation
Wax: SUNNOC N supplied by Ouchi Shinko Chemical Industrial Co., Ltd.
Antioxidant: NOCRAC 6C
(N-phenyl-N'-(1,3-dimethylbutyl)-p-phenylenediamine) supplied by Ouchi Shinko Chemical Industrial Co., Ltd.

Sulfur: Sulfur powder (200 meshes) supplied by Tsurumi Chemical Industry Co., Ltd.
Vulcanization accelerator (1): NOCCELER NS supplied by Ouchi Shinko Chemical Industrial Co., Ltd.
Vulcanization accelerator (2): NOCCELER D supplied by Ouchi Shinko Chemical Industrial Co., Ltd.
Lactic acid: Fermented lactic acid supplied by Fuso Chemical Co., Ltd.
Tartaric acid: L-Tartaric acid supplied by Fuso Chemical Co., Ltd.
Itaconic acid: Itaconic acid supplied by Fuso Chemical Co., Ltd.
Citric acid: Purified citric acid (anhydride) supplied by Fuso Chemical Co., Ltd.
Malic acid: Malic Acid Fuso (DL-malic acid) supplied by Fuso Chemical Co., Ltd.
Sodium malate (1): Sodium malate (Sodium DL-malate 1/2 hydrate) (average particle size: 100 μm) supplied by Fuso Chemical Co., Ltd.
Sodium malate (2): Sodium malate (Sodium DL-malate 1/2 hydrate) (average particle size: 400 μm) supplied by Fuso Chemical Co., Ltd.
Ammonium hydrogen carbonate: Ammonium hydrogen carbonate supplied by Nissei Corporation, Ltd.

Examples 1 to 100 and Comparative Examples 1 to 5

(First Base Mixing Step)

In accordance with formulations shown in Tables 1 to 4, 70 parts by mass of SBR (1), 30 parts by mass of NR, silica, 20 parts by mass of carbon black, a silane coupling agent, aromatic oil, and a hydroxy acid or itaconic acid were mixed with a 1.7-L Banbury mixer to give a mixture 1. According to Table 1 (Comparative Example 1, and Examples 1 to 26), 40 parts by mass of silica and eight parts by mass of aromatic oil were blended. According to Table 2 (Comparative Example 2, and Examples 27 to 52) and Table 4 (Comparative Examples 4 and 5, and Examples 79 to 100), 80 parts by mass of silica and 20 parts by mass of aromatic oil were blended. According to Table 3 (Comparative Example 3, and Examples 53 to 78), 120 parts by mass of silica and 35 parts by mass of aromatic oil were blended. The amount of the silane coupling agent was eight parts by mass for each 100 parts by mass of silica in each example. The amounts of lactic acid, tartaric acid, itaconic acid, citric acid, and malic acid shown in Tables 1 to 4 each indicate the amount (part (s)) by mass) for each 100 parts by mass of silica.

As the silane coupling agent, silane coupling agent 1 was used in Examples 1 to 78 and Comparative Examples 1 to 3, silane coupling agent 2 was used in Examples 79 to 89 and Comparative Example 4, and silane coupling agent 3 was used in Examples 90 to 100 and Comparative Example 5.

(Second Base Mixing Step)

Next, the mixture 1, two parts by mass of stearic acid, and three parts by mass of zinc oxide were mixed with the 1.7-L Banbury mixer to give a mixture 2.

(Final Mixing Step)

Then, the mixture 2, 1.5 parts by mass of sulfur, one part by mass of vulcanization accelerator (1), and 0.5 parts by mass of vulcanization accelerator (2) were mixed with an open roll mill to give an unvulcanized rubber composition.

(Vulcanization Step)

The resulting unvulcanized rubber composition was press-vulcanized at 170° C. for 20 minutes in a 0.5-mm-thick mold to give a vulcanized rubber composition.

Examples 101 and 102 and Comparative Example 6

(First Base Mixing Step)

In accordance with formulations shown in Table 5, 70 parts by mass of SBR (1), 30 parts by mass of NR, 80 parts by mass of silica, 20 parts by mass of carbon black, silane coupling agent 1, 20 parts by mass of aromatic oil, and a hydroxy acid were mixed with a 1.7-L Banbury mixer to give a mixture 1.

The amount of silane coupling agent 1 was eight parts by mass for each 100 parts by mass of silica. The amounts of citric acid, malic acid, and ammonium hydrogen carbonate shown in Table 5 each indicate the amount (part (s) by mass) for each 100 parts by mass of silica.

(Second Base Mixing Step)

Next, the mixture 1, two parts by mass of stearic acid, and three parts by mass of zinc oxide were mixed with the 1.7-L Banbury mixer to give a mixture 2.

(Final Mixing Step)

Then, the mixture 2, 1.5 parts by mass of sulfur, one part by mass of vulcanization accelerator (1), and 0.5 parts by mass of vulcanization accelerator (2) were mixed with an open roll mill to give an unvulcanized rubber composition.

(Vulcanization Step)

The resulting unvulcanized rubber composition was press-vulcanized at 170° C. for 20 minutes in a 0.5-mm-thick mold to give a vulcanized rubber composition.

Examples 103 and 104

(First Base Mixing Step)

In accordance with formulations shown in Table 5, 70 parts by mass of SBR (1), 30 parts by mass of NR, 80 parts by mass of silica, 20 parts by mass of carbon black, silane coupling agent 1, 20 parts by mass of aromatic oil, and a hydroxy acid were mixed with a 1.7-L Banbury mixer, and then ammonium hydrogen carbonate was added and mixed to give a mixture 1.

The amount of silane coupling agent 1 was eight parts by mass for each 100 parts by mass of silica.

(Second Base Mixing Step)

Next, the mixture 1, two parts by mass of stearic acid, and three parts by mass of zinc oxide were mixed with the 1.7-L Banbury mixer to give a mixture 2.

(Final Mixing Step)

Then, the mixture 2, 1.5 parts by mass of sulfur, one part by mass of vulcanization accelerator (1), and 0.5 parts by mass of vulcanization accelerator (2) were mixed with an open roll mill to give an unvulcanized rubber composition.

(Vulcanization Step)

The resulting unvulcanized rubber composition was press-vulcanized at 170° C. for 20 minutes in a 0.5-mm-thick mold to give a vulcanized rubber composition.

Examples 105 and 106

(First Base Mixing Step)

In accordance with formulations shown in Table 5, 70 parts by mass of SBR (1), 30 parts by mass of NR, 80 parts by mass of silica, 20 parts by mass of carbon black, silane coupling agent 1, 20 parts by mass of aromatic oil, and a hydroxy acid were mixed with a 1.7-L Banbury mixer to give a mixture 1.

The amount of silane coupling agent 1 was eight parts by mass for each 100 parts by mass of silica.

(Second Base Mixing Step)

Next, the mixture 1, two parts by mass of stearic acid, three parts by mass of zinc oxide, and ammonium hydrogen carbonate were mixed with the 1.7-L Banbury mixer to give a mixture 2.

(Final Mixing Step)

Then, the mixture 2, 1.5 parts by mass of sulfur, one part by mass of vulcanization accelerator (1), and 0.5 parts by mass of vulcanization accelerator (2) were mixed with an open roll mill to give an unvulcanized rubber composition.

(Vulcanization Step)

The resulting unvulcanized rubber composition was press-vulcanized at 170° C. for 20 minutes in a 0.5-mm-thick mold to give a vulcanized rubber composition.

Examples 107 to 111

(First Base Mixing Step)

In accordance with formulations shown in Table 6, chemicals shown in Step 1 in Table 6 were mixed with a 1.7-L Banbury mixer at 150° C. for three minutes to give a mixture 1.

(Second Base Mixing Step)

Next, the mixture 1 and chemicals shown in Step 2 in Table 6 were mixed with the 1.7-L Banbury mixer at 140° C. for three minutes to give a mixture 2.

(Final Mixing Step)

Then, the mixture 2 and chemicals shown in Step 3 in Table 6 were mixed with an open roll mill at 80° C. for three minutes to give an unvulcanized rubber composition.

(Vulcanization Step)

The resulting unvulcanized rubber composition was press-vulcanized at 170° C. for 15 minutes in a 0.5-mm-thick mold to give a vulcanized rubber composition.

Moreover, the vulcanized rubber composition was formed into a 10-mm-thick tread and assembled with other tire components. The assembly was vulcanized at 170° C. for 15 minutes to produce a test tire (tire size: 215/45ZR17).

The following evaluations were carried out on the obtained unvulcanized rubber compositions, vulcanized rubber compositions, and test tires. Tables 1 to 6 show the results. The term "n. d." in the Tables refers to "not detected". In the following evaluations, evaluations of the breaking energy index and the grip index were performed only on the examples in Table 6.

(Amount of Unreacted Coupling Agent)

The unvulcanized rubber composition was finely chopped and extracted for 24 hours with ethanol. The amount of the unreacted silane coupling agent extracted in the extraction liquid was measured by gas chromatography. The ratio (% by mass) of the unreacted silane coupling agent was calculated based on the blended amount of silane coupling agent. A smaller value of the ratio indicates a smaller amount of the silane coupling agent remaining unreacted in the unvulcanized rubber composition after the mixing step. Namely, this means that a larger amount of the silane coupling agent was reacted during the mixing step, which is favorable.

(Abrasion Index)

The volume loss of each vulcanized rubber composition was measured using a Lambourn abrasion tester at room temperature for a test time of three minutes under each of two conditions: on one hand a load of 2.5 kgf and a slip ratio of 40%, and on the other hand a load of 1.5 kgf and a slip ratio of 40%. The abrasion index of each example was calculated using the following equation when the abrasion index of Comparative Example 1, 2, 3, 4, 5, or 6 (Comparative Example 1 for examples in Table 1, Comparative Example 2 for examples in Table 2, Comparative Example 3 for examples in Table 3, Comparative Example 4 for Examples 79 to 89 in Table 4, Comparative Example 5 for Examples 90 to 100 in Table 4, and Comparative Example 6 for examples in Table 5) was regarded as 100. A larger abrasion index indicates better abrasion resistance. (Abrasion index)=(Total amount of volume losses of Comparative Example 1, 2, 3, 4, 5, or 6)/(Total amount of volume losses of each example)×100

With regard to examples in Table 6, the volume loss of each vulcanized rubber composition was measured at room temperature for a test time of three minutes under the conditions of a load of 1.0 kgf and a slip ratio of 30%. The abrasion index of each example was calculated using the following equation when the abrasion index of Example 107 was regarded as 100. (Abrasion index)=(Volume loss of Example 107)/(Volume loss of each example)×100

(Rolling Resistance Index)

The tan δ of each vulcanized rubber composition was measured by using a viscoelastic spectrometer VES (Iwamoto Seisakusho) under the conditions of a temperature of 70° C., an initial strain of 10%, and a dynamic strain of 2%. The rolling resistance index of each example was calculated using the following equation when the rolling resistance index of Comparative Example 1, 2, 3, 4, 5, or 6, or Example 107 (Comparative Example 1 for examples in Table 1, Comparative Example 2 for examples in Table 2, Comparative Example 3 for examples in Table 3, Comparative Example 4 for Examples 79 to 89 in Table 4, Comparative Example 5 for Examples 90 to 100 in Table 4, Comparative Example 6 for examples in Table 5, and Example 107 for examples in Table 6) was regarded as 100. A larger rolling resistance index indicates better characteristic of rolling resistance (better fuel economy). (Rolling resistance index)=(tan δ of Comparative Example 1, 2, 3, 4, 5, or 6, or Example 107)/(tan δ of each example)×100

(Breaking Energy Index)

In accordance with JIS K6251 "Rubber, vulcanized or thermoplastic—Determination of tensile stress-strain properties", a tensile test was carried out using a No. 3 dumbbell sample prepared from a sheet (2 mm thick) cut out of the tread of each test tire to determine the breaking energy (tensile strength at break (MPa)×elongation at break (%)). The results are each shown as an index number relative to that of Example 107 regarded as 100. A larger breaking energy index indicates better breaking properties.

(Grip Index)

The test tires were mounted on all wheels of an automobile (domestic FF (2000 cc), rim size: 16×7.0 JJ/+20 mm/5H, internal tire pressure: 240 kPa) and an actual running test was carried out on a test course with a wet asphalt surface. The stability of steering control during the running was evaluated by a test driver. The results are each shown as an index number relative to that of Example 107 regarded as 100. A larger grip index indicates better grip performance (handling stability) on a wet road surface.

TABLE 1

40 Parts by mass of silica and 8 parts by mass of aromatic oil (with silane coupling agent 1)

|  | Comparative Example 1 | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Amount of lactic acid | — | 0.5 | 1 | 5 | 10 | 20 | — | — | — | — | — | — |
| Amount of tartaric acid | — | — | — | — | — | — | 0.5 | 1 | 2 | 5 | 10 | 20 |
| Amount of unreacted coupling agent (% by mass) | 17.3 | 7.5 | 2.5 | n.d. | n.d. | n.d. | 8.1 | 2.7 | n.d. | n.d. | n.d. | n.d. |
| Abrasion index | 100 | 102 | 104 | 107 | 106 | 102 | 106 | 107 | 108 | 104 | 103 | 102 |
| Rolling resistance index | 100 | 101 | 105 | 108 | 105 | 103 | 107 | 108 | 106 | 105 | 105 | 103 |

|  | Example 12 | Example 13 | Example 14 | Example 15 | Example 16 | Example 17 | Example 18 | Example 19 | Example 20 | Example 21 |
|---|---|---|---|---|---|---|---|---|---|---|
| Amount of itaconic acid | 0.5 | 1 | 5 | 10 | 20 | — | — | — | — | — |
| Amount of citric acid | — | — | — | — | — | 0.5 | 1 | 5 | 10 | 20 |
| Amount of unreacted coupling agent (% by mass) | 6.5 | n.d. | n.d. | n.d. | n.d. | 6.5 | n.d. | n.d. | n.d. | n.d. |
| Abrasion index | 101 | 104 | 108 | 110 | 110 | 102 | 107 | 112 | 106 | 104 |
| Rolling resistance index | 102 | 110 | 109 | 106 | 107 | 104 | 107 | 109 | 107 | 106 |

|  | Example 22 | Example 23 | Example 24 | Example 25 | Example 26 |
|---|---|---|---|---|---|
| Amount of malic acid | 0.5 | 1 | 5 | 10 | 20 |
| Amount of unreacted coupling agent (% by mass) | 4.8 | n.d. | n.d. | n.d. | n.d. |
| Abrasion index | 105 | 115 | 108 | 105 | 103 |
| Rolling resistance index | 101 | 102 | 104 | 105 | 104 |

TABLE 2

80 Parts by mass of silica and 20 parts by mass of aromatic oil (with silane coupling agent 1)

|  | Comparative Example 2 | Example 27 | Example 28 | Example 29 | Example 30 | Example 31 | Example 32 | Example 33 | Example 34 | Example 35 | Example 36 | Example 37 |
|---|---|---|---|---|---|---|---|---|---|---|---|---|
| Amount of lactic acid | — | 0.5 | 1 | 5 | 10 | 20 | — | — | — | — | — | — |
| Amount of tartaric acid | — | — | — | — | — | — | 0.5 | 1 | 2 | 5 | 10 | 20 |
| Amount of unreacted coupling agent (% by mass) | 19.3 | 8.2 | 2.8 | n.d. | n.d. | n.d. | 8.5 | 3.2 | n.d. | n.d. | n.d. | n.d. |
| Abrasion index | 100 | 103 | 104 | 106 | 104 | 101 | 102 | 103 | 106 | 106 | 103 | 101 |
| Rolling resistance index | 100 | 101 | 102 | 109 | 106 | 102 | 101 | 102 | 103 | 103 | 102 | 102 |

|  | Example 38 | Example 39 | Example 40 | Example 41 | Example 42 | Example 43 | Example 44 | Example 45 | Example 46 | Example 47 |
|---|---|---|---|---|---|---|---|---|---|---|
| Amount of itaconic acid | 0.5 | 1 | 5 | 10 | 20 | — | — | — | — | — |
| Amount of citric acid | — | — | — | — | — | 0.5 | 1 | 5 | 10 | 20 |
| Amount of unreacted coupling agent (% by mass) | 7.2 | 0.9 | n.d. | n.d. | n.d. | 7.4 | 1.2 | n.d. | n.d. | n.d. |
| Abrasion index | 102 | 102 | 104 | 105 | 102 | 106 | 108 | 113 | 110 | 106 |
| Rolling resistance index | 103 | 100 | 101 | 103 | 101 | 104 | 107 | 109 | 107 | 106 |

|  | Example 48 | Example 49 | Example 50 | Example 51 | Example 52 |
|---|---|---|---|---|---|
| Amount of malic acid | 0.5 | 1 | 5 | 10 | 20 |
| Amount of unreacted coupling agent (% by mass) | 5.5 | 1.2 | n.d. | n.d. | n.d. |
| Abrasion index | 106 | 116 | 110 | 107 | 103 |
| Rolling resistance index | 101 | 101 | 102 | 104 | 103 |

TABLE 3

120 Parts by mass of silica and 35 parts by mass of aromatic oil (with silane coupling agent 1)

|  | Comparative Example 3 | Example 53 | Example 54 | Example 55 | Example 56 | Example 57 | Example 58 | Example 59 | Example 60 | Example 61 | Example 62 | Example 63 |
|---|---|---|---|---|---|---|---|---|---|---|---|---|
| Amount of lactic acid | — | 0.5 | 1 | 5 | 10 | 20 | — | — | — | — | — | — |
| Amount of tartaric acid | — | — | — | — | — | — | 0.5 | 1 | 2 | 5 | 10 | 20 |
| Amount of unreacted coupling agent (% by mass) | 23.4 | 9.5 | 3.5 | 0.9 | n.d. | n.d. | 9.8 | 4.5 | 1.1 | n.d. | n.d. | n.d. |
| Abrasion index | 100 | 106 | 107 | 111 | 108 | 106 | 110 | 114 | 116 | 111 | 107 | 107 |
| Rolling resistance index | 100 | 106 | 108 | 110 | 109 | 105 | 110 | 109 | 107 | 107 | 106 | 106 |

|  | Example 64 | Example 65 | Example 66 | Example 67 | Example 68 | Example 69 | Example 70 | Example 71 | Example 72 | Example 73 |
|---|---|---|---|---|---|---|---|---|---|---|
| Amount of itaconic acid | 0.5 | 1 | 5 | 10 | 20 | — | — | — | — | — |
| Amount of citric acid | — | — | — | — | — | 0.5 | 1 | 5 | 10 | 20 |
| Amount of unreacted coupling agent (% by mass) | 8.7 | 1.5 | n.d. | n.d. | n.d. | 8.5 | 1.1 | n.d. | n.d. | n.d. |
| Abrasion index | 107 | 112 | 118 | 116 | 112 | 112 | 114 | 119 | 116 | 112 |
| Rolling resistance index | 106 | 113 | 110 | 109 | 106 | 110 | 120 | 117 | 115 | 113 |

|  | Example 74 | Example 75 | Example 76 | Example 77 | Example 78 |
|---|---|---|---|---|---|
| Amount of malic acid | 0.5 | 1 | 5 | 10 | 20 |
| Amount of unreacted coupling agent (% by mass) | 6.9 | 1.6 | n.d. | n.d. | n.d. |
| Abrasion index | 114 | 124 | 126 | 115 | 111 |
| Rolling resistance index | 105 | 105 | 105 | 108 | 107 |

TABLE 4

80 Parts by mass of silica and 20 parts by mass of aromatic oil (with silane coupling agent 2)

|  | Comparative Example 4 | Example 79 | Example 80 | Example 81 | Example 82 | Example 83 | Example 84 | Example 85 | Example 86 | Example 87 | Example 88 | Example 89 |
|---|---|---|---|---|---|---|---|---|---|---|---|---|
| Amount of citric acid | — | 0.5 | 1 | 5 | 10 | 20 | — | — | — | — | — | — |
| Amount of malic acid | — | — | — | — | — | — | 0.5 | 1 | 2 | 5 | 10 | 20 |
| Abrasion index | 100 | 108 | 110 | 115 | 113 | 107 | 109 | 118 | 120 | 118 | 110 | 104 |
| Rolling resistance index | 100 | 105 | 108 | 112 | 108 | 107 | 103 | 104 | 105 | 107 | 106 | 104 |

80 Parts by mass of silica and 20 parts by mass of aromatic oil (with silane coupling agent 3)

|  | Comparative Example 5 | Example 90 | Example 91 | Example 92 | Example 93 | Example 94 | Example 95 | Example 96 | Example 97 | Example 98 | Example 99 | Example 100 |
|---|---|---|---|---|---|---|---|---|---|---|---|---|
| Amount of citric acid | — | 0.5 | 1 | 5 | 10 | 20 | — | — | — | — | — | — |
| Amount of malic acid | — | — | — | — | — | — | 0.5 | 1 | 2 | 5 | 10 | 20 |
| Abrasion index | 100 | 110 | 115 | 112 | 106 | 104 | 112 | 117 | 113 | 108 | 104 | 102 |
| Rolling resistance index | 100 | 104 | 107 | 110 | 108 | 103 | 108 | 112 | 117 | 110 | 108 | 103 |

TABLE 5

80 Parts by mass of silica and 20 parts by mass of aromatic oil (with silane coupling agent 1)

|  | Comparative Example 6 | Example 101 | Example 102 | Example 103 | Example 104 | Example 105 | Example 106 |
|---|---|---|---|---|---|---|---|
| Amount of citric acid | — | 1 | — | 1 | — | 1 | — |
| Amount of mallic acid | — | — | 1 | — | 1 | — | 1 |
| Amount of ammonium hydrogen carbonate | — | — | — | 2 | 2 | 2 | 2 |
| Timing of addition of ammonium hydrogen carbonate | — | — | — | Middle of first base mixing step | Middle of first base mixing step | Second base mixing step | Second base mixing step |

TABLE 5-continued

80 Parts by mass of silica and 20 parts by mass of aromatic oil (with silane coupling agent 1)

| | Comparative Example 6 | Example 101 | Example 102 | Example 103 | Example 104 | Example 105 | Example 106 |
|---|---|---|---|---|---|---|---|
| Amount of unreacted coupling agent (% by mass) | 19.3 | 1.2 | 1.2 | 1.0 | 1.0 | 0.7 | 0.8 |
| Abrasion index | 100 | 108 | 116 | 113 | 120 | 124 | 127 |
| Rolling resistance index | 100 | 107 | 101 | 109 | 112 | 108 | 106 |

TABLE 6

| | | | Example 107 | Example 108 | Example 109 | Example 110 | Example 111 |
|---|---|---|---|---|---|---|---|
| Amounts (part(s) by mass) | Step 1 | SBR(2) | 80 | 80 | 80 | 80 | 80 |
| | | BR | 20 | 20 | 20 | 20 | 20 |
| | | Silica | 70 | 70 | 20 | 100 | 70 |
| | | Carbon black | 10 | 10 | 60 | 10 | 10 |
| | | Silane coupling agent 4 | 5.6 | 5.6 | 1.6 | 8 | 5.6 |
| | | Malic acid | 2 | — | — | — | — |
| | | Sodium malate (1) | — | 2.1 | 0.6 | 3 | — |
| | | Sodium malate (2) | — | — | — | — | 2 |
| | | Aromatic oil | 10 | 10 | 10 | 10 | 10 |
| | Step 2 | Wax | 2 | 2 | 2 | 2 | 2 |
| | | Antioxidant | 2 | 2 | 2 | 2 | 2 |
| | | Stearic acid | 2 | 2 | 2 | 2 | 2 |
| | | Zinc oxide | 3 | 3 | 3 | 3 | 3 |
| | Step 3 | Sulfur | 1.5 | 1.5 | 1.5 | 1.5 | 1.5 |
| | | Vulcanization accelerator (1) | 1.5 | 1.5 | 1.5 | 1.5 | 1.5 |
| | | Vulcanization accelerator (2) | 1.5 | 1.5 | 1.5 | 1.5 | 1.5 |
| Evaluations | | Amount of unreacted coupling agent (% by mass) | 10 | 10 | 10 | 10 | 15 |
| | | Grip index | 100 | 125 | 110 | 130 | 113 |
| | | Abrasion index | 100 | 125 | 125 | 120 | 100 |
| | | Breaking energy index | 100 | 115 | 115 | 115 | 95 |
| | | Rolling resistance index | 100 | 125 | 110 | 120 | 113 |

In Examples in which silica, a silane coupling agent, and at least one selected from the group consisting of a hydroxy acid, itaconic acid, and a salt thereof were contained, the amount of the unreacted silane coupling agent was as small as less than 10% by mass, and the fuel economy and the abrasion resistance were excellent. In Examples 79 to 100 in which silane coupling agent 2 or 3 was used, the fuel economy and the abrasion resistance were better than those in Examples 1 to 78 in which silane coupling agent 1 was used. In Examples 103 to 106 in which an ammonium salt was blended, the fuel economy and the abrasion resistance were better than those in Examples 101 and 102 in which no ammonium salt was blended. Moreover, as seen in Table 6, in Examples 108 to 110 in which sodium malate having an average particle size of 100 μm was blended, the fuel economy and the abrasion resistance were better than those in Example 107 in which malic acid was blended and Example 111 in which sodium malate having an average particle size of 400 μm was blended. In addition, the grip performance and the breaking properties were favorable in Examples 108 to 110.

The invention claimed is:

1. A method for producing a rubber composition for a tire, comprising:
   a first base mixing step of mixing a rubber component, silica, a silane coupling agent, and at least one selected from the group consisting of a hydroxy acid, itaconic acid, and a salt thereof to form a first mixture;
   a second base mixing step of mixing the first mixture obtained in the first base mixing step, stearic acid, and zinc oxide to obtain a second mixture; and
   a final mixing step of mixing the second mixture obtained in the second base mixing step, a vulcanizing agent, and a vulcanization accelerator,
   wherein the hydroxy acid is at least one selected from the group consisting of lactic acid, malic acid, tartaric acid, citric acid, cerebronic acid, tartronic acid, hydroxybutyric acid, leucic acid, glycolic acid, pantoic acid, salicylic acid, and benzylic acid.

2. The method for producing a rubber composition for a tire according to claim 1, wherein the first mixture further comprises carbon black.

3. The method for producing a rubber composition for a tire according to claim 1, wherein the hydroxy acid is at least one selected from the group consisting of lactic acid, malic acid, tartaric acid, and citric acid.

4. The method for producing a rubber composition for a tire according to claim 1, wherein the hydroxy acid is malic acid.

5. The method for producing a rubber composition for a tire according to claim 1, wherein the salt is sodium malate.

6. The method for producing a rubber composition for a tire according to claim 1, wherein the hydroxy acid, itaconic acid, and salt thereof each have an average particle size of not more than 300 μm.

7. The method for producing a rubber composition for a tire according to claim 1, wherein the amount of the unreacted silane coupling agent is not more than 15% by mass.

8. The method for producing a rubber composition for a tire according to claim 1, wherein the silane coupling agent is at least one selected from the group consisting of a sulfide-type silane coupling agent, a silane coupling agent represented by Formula (1):

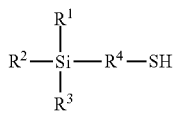
(1)

wherein $R^1$ represents a group represented by —O—($R^5$—O)$_m$—$R^6$ in which $R^5$ represents the same or different groups selected from branched or unbranched C1 to C30 divalent hydrocarbon groups, $R^6$ represents a branched or unbranched C1 to C30 alkyl group, a branched or unbranched C2 to C30 alkenyl group, a C6 to C30 aryl group, or a C7 to C30 aralkyl group, and m represents an integer of 1 to 30; $R^2$ and $R^3$ are the same as or different from each other and each represent the same group as $R^1$, a branched or unbranched C1 to C12 alkyl group, or a group represented by —O—$R^7$ in which $R^7$ represents a hydrogen atom, a branched or unbranched C1 to C30 alkyl group, a branched or unbranched C2 to C30 alkenyl group, a C6 to C30 aryl group, or a C7 to C30 aralkyl group; and $R^4$ represents a branched or unbranched C1 to C30 alkylene group, and a silane coupling agent comprising linking units A and B respectively represented by Formula (2):

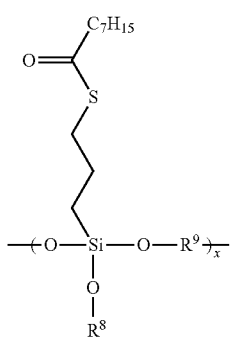
(2)

and Formula (3):

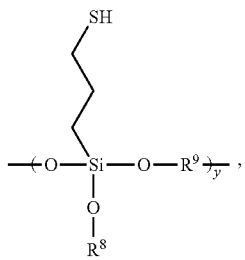
(3)

wherein x is an integer of not smaller than 0; y is an integer of not smaller than 1; $R^8$ represents hydrogen, a branched or unbranched C1 to C30 alkyl or alkylene group, a branched or unbranched C2 to C30 alkenyl or alkenylene group, a branched or unbranched C2 to C30 alkynyl or alkynylene group, or a group in which an end of the alkyl or alkenyl group is substituted by a hydroxy or carboxyl group; $R^9$ represents hydrogen, a branched or unbranched C1 to C30 alkylene or alkyl group, a branched or unbranched C2 to C30 alkenylene or alkenyl group, or a branched or unbranched C2 to C30 alkynylene or alkynyl group; and $R^8$ and $R^9$ may together form a ring structure.

9. The method for producing a rubber composition for a tire according to claim 1, wherein the amount of the hydroxy acid, itaconic acid, and salt thereof is 0.01 to 25 parts by mass for each 100 parts by mass of the silica.

10. The method for producing a rubber composition for a tire according to claim 1, wherein the first mixture further comprises an ammonium salt.

11. The method for producing a rubber composition for a tire according to claim 10, wherein the ammonium salt is ammonium carbonate or ammonium hydrogen carbonate.

* * * * *